United States Patent

Taketani et al.

Patent Number: 5,956,095
Date of Patent: Sep. 21, 1999

[54] NOISE SUPPRESSION APPARATUS

[75] Inventors: Nobuo Taketani, Kawanishi; Hiroshi Ando, Osaka; Tsuneo Matsukura, Osaka; Hiroyasu Shimaoka, Osaka; Hitoshi Adachi, Osaka, all of Japan

[73] Assignee: Matsushita Electric Industrial Co., Ltd., Osaka, Japan

[21] Appl. No.: 08/866,883

[22] Filed: May 30, 1997

[30] Foreign Application Priority Data

May 30, 1996 [JP] Japan .................................. 8-136221

[51] Int. Cl.⁶ .................................................. H04N 5/14
[52] U.S. Cl. .......................... 348/607; 348/627; 348/609; 348/623; 348/663
[58] Field of Search .................................. 348/607, 627, 348/618, 609, 610, 726, 727, 623, 663, 668, 631, 608; H04N 5/14

[56] References Cited

U.S. PATENT DOCUMENTS

| | | | |
|---|---|---|---|
| 3,760,094 | 9/1973 | Skerlos | 348/727 |
| 4,081,836 | 3/1978 | Skinner | 348/627 |
| 4,142,211 | 2/1979 | Faroudja | 358/167 |
| 4,350,995 | 9/1982 | Harlan | 358/37 |
| 4,351,003 | 9/1982 | Harlan | 358/166 |
| 4,376,952 | 3/1983 | Troiano | 358/166 |
| 5,113,439 | 5/1992 | Hashimoto | 380/7 |
| 5,140,424 | 8/1992 | Yoshimura et al. | 348/607 |
| 5,200,824 | 4/1993 | Kageyama | 348/607 |
| 5,225,907 | 7/1993 | Casavant et al. | 348/607 |
| 5,337,091 | 8/1994 | Harford et al. | 348/737 |
| 5,369,445 | 11/1994 | Harford | 348/618 |
| 5,446,500 | 8/1995 | Harford | 348/618 |
| 5,457,500 | 10/1995 | Harford | 348/727 |
| 5,512,958 | 4/1996 | Rzeszewski | 348/607 |
| 5,526,062 | 6/1996 | Harford | 348/727 |
| 5,623,320 | 4/1997 | Rim | 348/607 |
| 5,715,000 | 2/1998 | Inamori | 348/627 |
| 5,742,355 | 4/1998 | De Haan et al. | 348/607 |
| 5,745,188 | 4/1998 | Antonov | 348/607 |

FOREIGN PATENT DOCUMENTS

| | | |
|---|---|---|
| 4-48826 | 2/1992 | Japan . |
| 4-259170 | 9/1992 | Japan . |
| 4-313980 | 11/1992 | Japan . |
| 1257992 | 12/1971 | United Kingdom . |
| 1313420 | 4/1973 | United Kingdom . |
| 2 181 322 | 4/1987 | United Kingdom . |
| 2 256 991 | 12/1992 | United Kingdom . |

OTHER PUBLICATIONS

Search Report for GB 9711076 dated Jul. 22, 1997.

*Primary Examiner*—John K. Peng
*Assistant Examiner*—Jean W. Désir
*Attorney, Agent, or Firm*—Ratner & Prestia

[57] ABSTRACT

A noise suppression apparatus suppresses noise of a luminance signal, for example, at a fringe of area of reception in a television receiver. The noise suppression apparatus includes a tuner circuit, an intermediate frequency amplification circuit, a video detection/amplification circuit, an AGC detection/amplification circuit, an RF AGC circuit, a sound/chrominance signal separation circuit, a luminance signal processing circuit and a luminance signal noise suppression circuit.

19 Claims, 9 Drawing Sheets

NOISE SUPPRESSION APPARATUS

BACKGROUND OF THE INVENTION (1) Field of the Invention

The present invention relates to a noise suppression apparatus for suppressing noise of a luminous signal in a television receiver at, for example, a fringe area of reception.

(2) Description of the Prior Art

Figure 8:
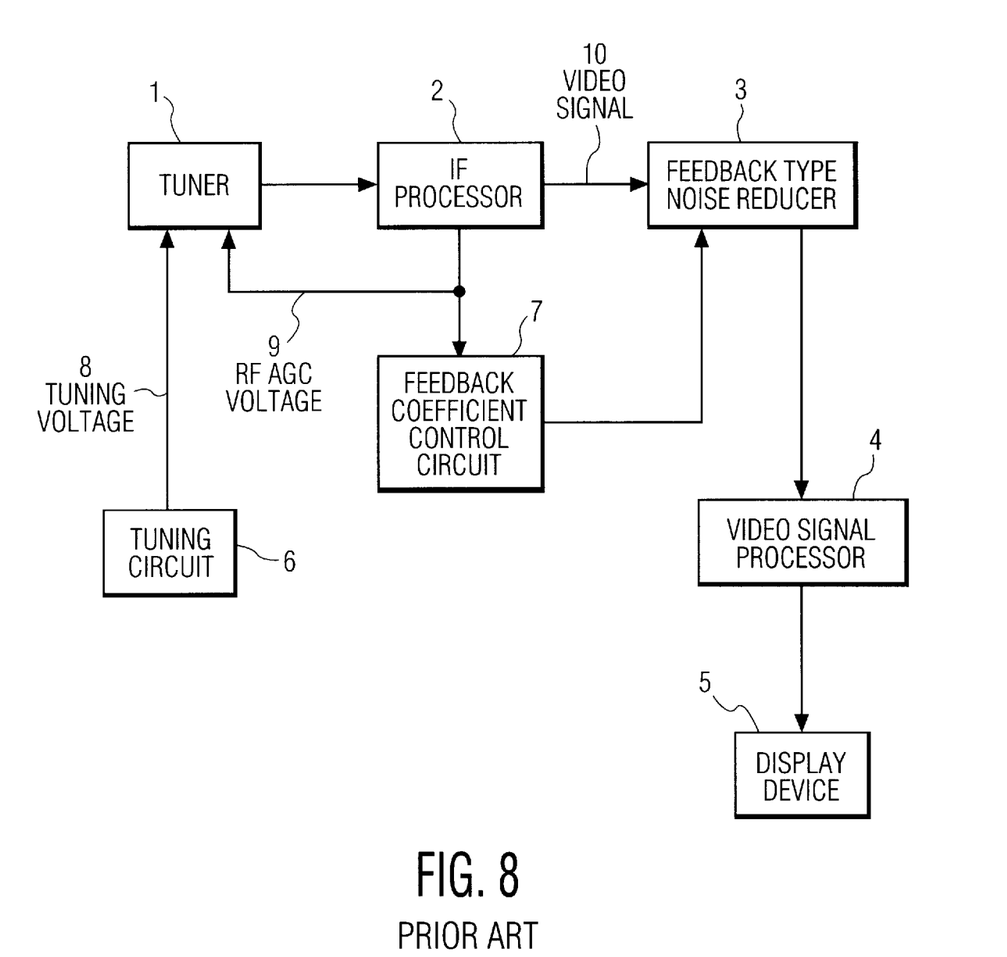
FIG. 8 is a block diagram of a noise suppression apparatus in accordance with the prior art.

FIG. 8 is a block diagram of a noise suppression apparatus proposed in Japanese Patent Laid-Open 2-213284. In FIG. 8, the block 1 is a tuner. The block 2 is an IF processing circuit. The block 3 is a feedback type noise reducer. The block 4 is a video signal processing circuit. The block 5 is a display. The block 6 is a tuning circuit. The block 7 is a feedback coefficient control circuit. The voltage 8 is a tuning voltage. The voltage 9 is an AGC voltage. The signal 10 is a video signal.

The function of a noise suppression apparatus composed like the above is explained below.

When an electric field strength is strong, if an AGC circuit of tuner 1 is a forward type, RF AGC voltage 9 is high and output K of feedback coefficient control circuit 7 is small. Therefore, the component ratio of the present frame to the last frame at the output of feedback type noise reducer 3 has a less effect to reduce noise when the present video signal is large but there is no blur at a violent movement scene such as scene changing.

On the other hand, when the electric field strength is weak, RF AGC voltage 9 is low and output K of feedback coefficient control circuit 7 is large. Therefore, the component ratio of the present frame to the last frame at the output of feedback type noise reducer 3 brings a big blur when the video signal output at a frame ahead of the present frame is large and for a violent movement scene but noise reducing effect becomes large.

Figure 9A:
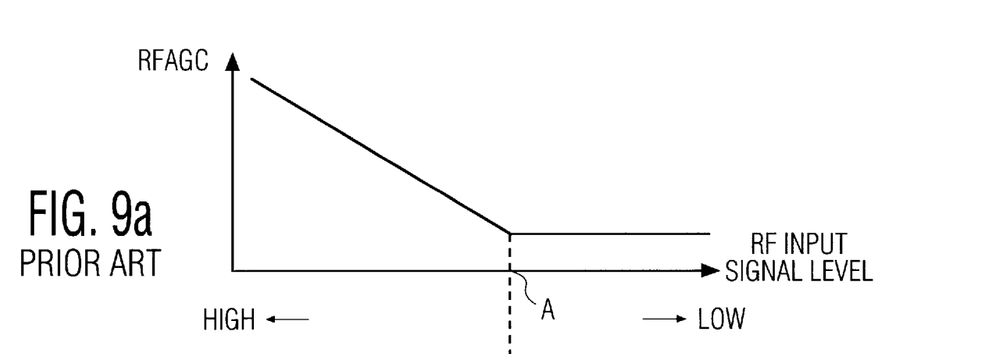
FIG. 9(a) illustrates the characteristic of RF AGC voltage against electric field strength of a noise suppression apparatus in accordance with the prior art.
Figure 9B:
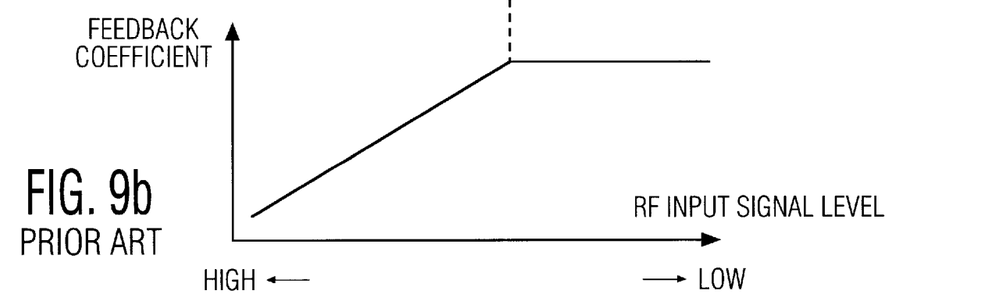
FIG. 9(b) illustrates the characteristic of feedback coefficient against electric field strength of a noise suppression apparatus in accordance with the prior art.

However, in the above composition, there are the following problems. FIGS. 9(a) and 9(b) illustrate characteristics of a noise suppression apparatus proposed in Japanese Patent Laid-Open 1-213284. FIG. 9(a) shows a characteristic of RF AGC voltage 9 against electric field strength inputted and FIG. 9(b) shows a characteristic of output voltage of feedback coefficient control circuit 7 against electric field strength inputted.

Generally, when the input electric field strength is smaller than a certain level (point A in FIGS. 9(a) and 9(b)), the RE AGC voltage does not change. Because also the output voltage of feedback coefficient control circuit 7 similarly changes, if the input electric field strength is smaller than a certain level (point A in FIGS. 9(a) and 9(b)), the noise reduction effect does not change.

Considering that the noise remarkably increases when the input electric field strength is smaller than a certain level (point A in FIGS. 9(a) and 9(b)), the noise reduction effect at a fringe area reception can not be so expected.

SUMMARY OF THE INVENTION

A noise suppression apparatus in accordance with an exemplary embodiment of the present invention includes a tuner circuit, a video IF (intermediate frequency) amplifier circuit, a video detector/amplifier circuit, an AGC detector/amplifier circuit, an RF AGC circuit, a sound/chrominance separator circuit, a luminance signal noise suppression circuit and a luminance signal processing circuit.

In accordance with an exemplary embodiment of the present invention, a noise suppression apparatus suppresses noise of a luminance signal at a fringe area of reception and controls a suppression level of a luminance signal noise suppression circuit by an IF AGC voltage.

In accordance with a further exemplary embodiment of the present invention, a noise suppression apparatus includes a tuner circuit, a video IF amplifier circuit, a video detector/amplifier circuit, an AGC detector/amplifier circuit, an RF AGC circuit, a sound/chrominance separator circuit, a luminance signal noise suppression circuit and a luminance signal processing circuit. The noise suppression apparatus suppresses noise of a luminance signal at a fringe area of reception and controls suppression level of a luminance signal noise suppression circuit by an IF AGC voltage.

In accordance with a further exemplary embodiment of the present invention, a noise suppression apparatus suppresses noise of a luminance signal at a fringe area of reception and controls a suppression level of a luminance signal noise suppression circuit by an IF AGC voltage.

In accordance with a further exemplary embodiment of the present invention, a noise suppression apparatus includes a tuner circuit, a video IF amplifier circuit, a video detector/amplifier circuit, an AGC detector/amplifier circuit, an RF AGC circuit, a sound/chrominance separator circuit, a first delay circuit, a second delay circuit, a first inverter circuit, a second inverter circuit, an amplifier circuit, a first addition circuit, a coring circuit, a gain control circuit, a second addition circuit and a luminance signal processing circuit. Noise of a luminance signal is suppressed at a fringe area of reception and a suppression level of a luminance signal noise suppression circuit is controlled by an IF AGC voltage.

In accordance with a further exemplary embodiment of the present invention, a noise suppression apparatus suppresses noise when an inputted RF signal level is lower than a designated level and a suppression level of a luminance signal noise suppression circuit is controlled by an IF AGC voltage.

In accordance with a further exemplary embodiment of the present invention, a noise suppression apparatus includes a tuner circuit, a video intermediate frequency amplifier circuit, a video detection/amplification circuit, an AGC detection/amplification circuit, an RF AGC circuit, a sound/chrominance signal separation circuit, a luminance signal noise suppression circuit, a differential amplifier circuit and a luminance signal processing circuit. Noise is suppressed when the RF input signal level is lower than a designated level and a suppression level of the luminance signal noise suppression circuit is controlled by an IF AGC voltage.

In accordance with a further exemplary embodiment of the present invention, a noise suppression apparatus suppresses noise when the electric field strength is smaller than a designated level controls a suppression level of the luminance signal noise suppression circuit by an IF AGC voltage.

In accordance with a further exemplary embodiment of the present invention, a noise suppression apparatus includes a tuner circuit, a video intermediate frequency amplifier circuit, a video detection/amplification circuit, an AGC detection/amplification circuit, an RF AGC circuit, a sound/chrominance signal separation circuit, a first delay circuit, a second delay circuit, a first inverter circuit, a second inverter circuit, an amplifier circuit, a first addition circuit, a coring circuit, a gain control circuit, a second addition circuit, a differential amplifier circuit and a luminance signal processing circuit. Noise is suppressed when the RF input signal level is lower than a designated level and a suppression level of the luminance signal noise suppression circuit is controlled by an IF AGC voltage.

DETAILED DESCRIPTION OF THE INVENTION

Exemplary embodiments of the present invention are explained below, referring to the drawings.

(First Exemplary Embodiment)

Figure 1:
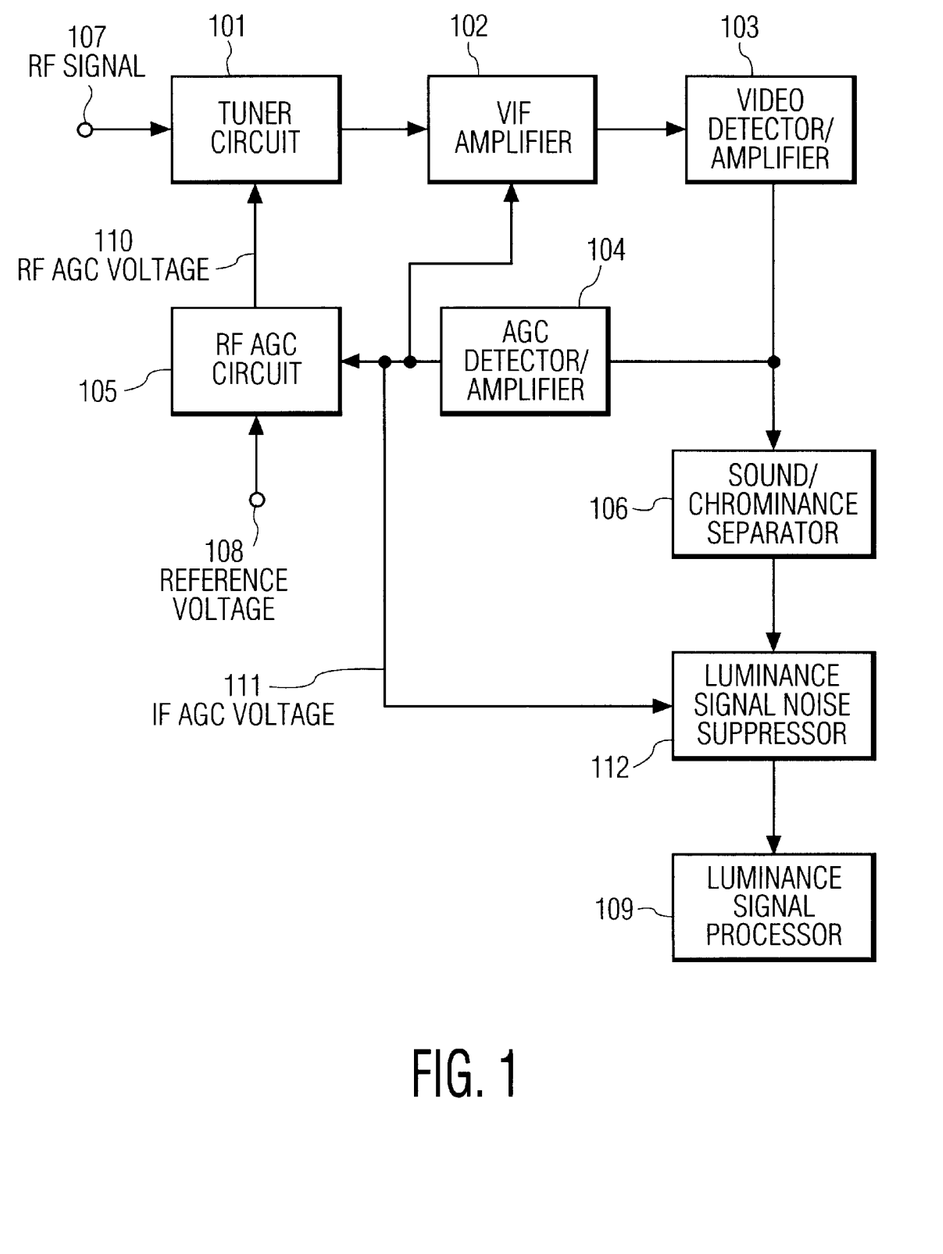
FIG. 1 is a block diagram of a noise suppression apparatus in accordance with a first exemplary embodiment of the present invention.

FIG. 1 is a block diagram of a noise suppression apparatus in accordance with a first exemplary embodiment of the present invention. In FIG. 1, the block 101 is a tuner circuit. The block 102 is a video IF amplifier circuit. The block 103 is a video detector/amplifier circuit. The block 104 is an AGC detector/amplifier circuit. The block 105 is an RF AGC circuit. The block 106 is a sound/chrominance separator circuit. The signal 107 is an RF signal. The voltage 108 is a reference voltage. The block 109 is a luminance signal processing circuit. The voltage 110 is an RF AGC voltage. The voltage 111 is an IF AGC voltage. The block 112 is a luminance signal noise suppression circuit.

The function of a noise suppression apparatus composed like the above is explained below, referring to FIGS. 1 and 5.

Figure 5A:
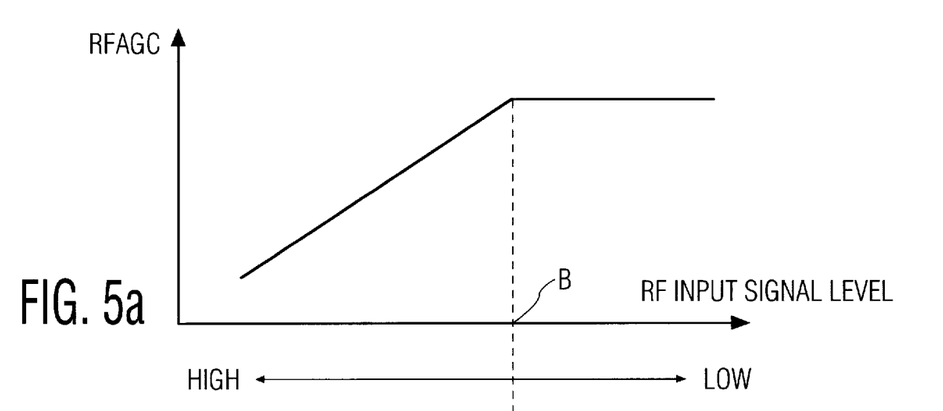
FIG. 5(a) illustrates the characteristic of RF AGC voltage against electric field strength of a noise suppression apparatus in accordance with the first and second exemplary embodiments of the present invention.
Figure 5B:
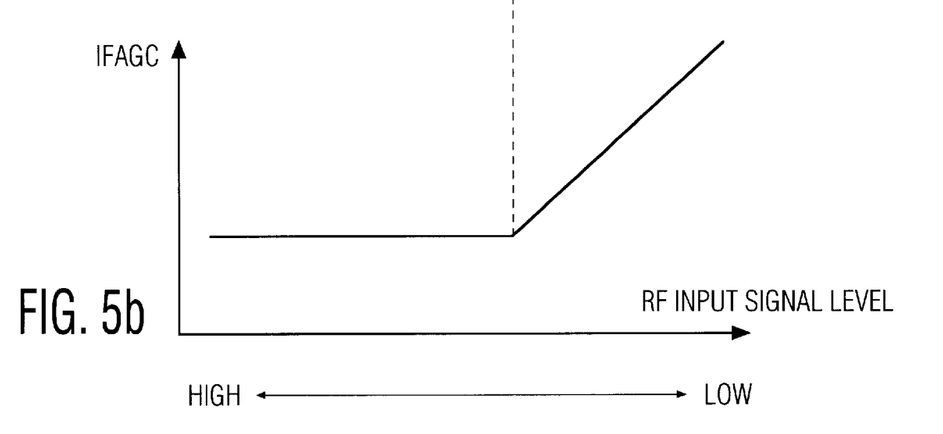
FIG. 5(b) illustrates the characteristic of IF AGC voltage against electric field strength of a noise suppression apparatus in accordance with the first and second exemplary embodiments of the present invention.

FIG. 5 shows characteristics to explain the function of a noise suppression apparatus shown in FIG. 1. FIG. 5(a) is a characteristic of RF AGC voltage 110 against RF input signal level 107 (electric field strength) and FIG. 5(b) is a characteristic of IF AGC voltage 111 against RF input signal level 107.

Here, a reverse type tuner circuit is used. When RF signal 107 varies from a strong electric field to a weak electric field, RF AGC voltage 110 linearly increases until point B and when the electric field becomes weak beyond point B, RF AGC voltage 110 does not vary as shown in FIG. 5(a). Thus, tuner circuit 101 controls the gain of video IF amplifier circuit 102 to keep the output level of the video signal constant until point B as shown in FIG. 5(a). When the RF input signal level is lower than level B, the gain of tuner circuit 101 becomes maximum and tuner circuit 101 works to control the gain of video IF amplifier circuit 102 to keep the output level of the video signal constant until level B. Therefore, when the RF input signal level 107 is higher than level B, IF AGC voltage 111 does not vary and when it is lower than level B, it varies the gain of video IF amplifier circuit 102 to keep the output level of the video signal constant as shown in FIG. 5(b).

Noise of a luminance signal at a fringe area of reception can be suppressed by controlling the noise suppression level of the luminance signal noise suppression circuit using IF AGC voltage 111.

Generally, considering that when the RF input signal level becomes lower beyond level B shown in FIG. 5, the noise remarkably increases, the noise suppression effect at a fringe area reception can be expected to increase.

Thus, according to a noise suppression apparatus in accordance with the first exemplary embodiment of the present invention, a noise suppression effect at a fringe area of reception can be expected by controlling the noise suppression level of luminance signal noise suppression circuit 112 using IF AGC voltage 111.

(Second Exemplary Embodiment)

Figure 2:
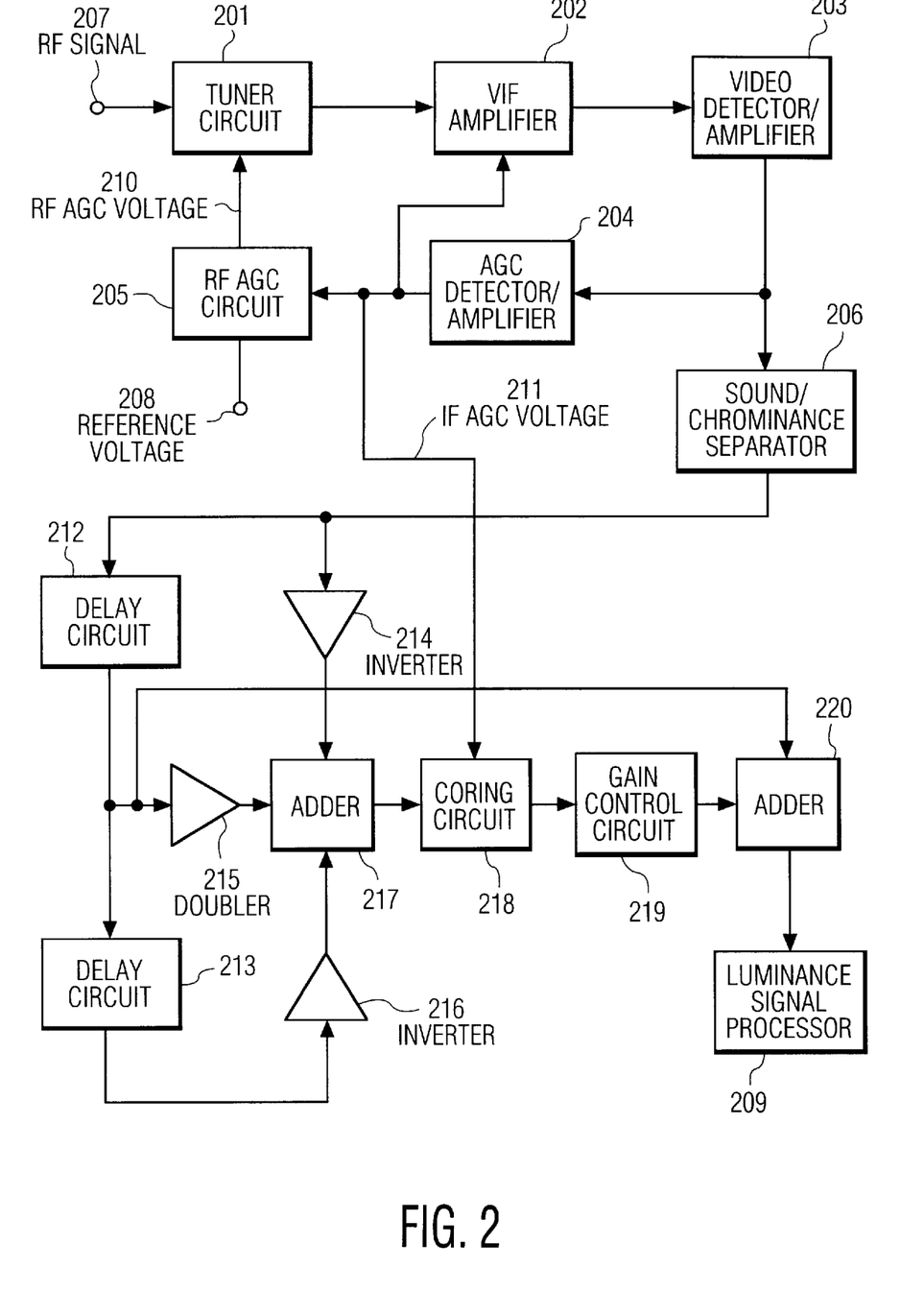
FIG. 2 is a block diagram of a noise suppression apparatus in accordance with a second exemplary embodiment of the present invention.

FIG. 2 is a block diagram of a noise suppression apparatus in accordance with a second exemplary embodiment of the present invention. In FIG. 2, the block 201 is a tuner circuit. The block 202 is a video IF amplifier circuit. The block 203 is a video detector/amplifier circuit. The block 204 is an AGC detector/amplifier circuit. The block 205 is an RF AGC circuit. The block 206 is a sound/chrominance separator circuit. The signal 207 is an RF signal. The voltage 208 is a reference voltage. The block 209 is a luminance signal processing circuit. The voltage 210 is an RF AGC voltage. The voltage 211 is an IF AGC voltage. The block 212 and 213 are delay circuits. The blocks 214 and 216 are inverter circuits. The block 215 is an amplifier circuit. The blocks 217 and 220 are addition circuits. The block 218 is a coring circuit. The block 219 is a gain control circuit.

The function of a noise suppression apparatus composed like the above is explained below, referring to FIGS. 2, 5 and 6.

FIG. 5 is similar to that used in the first exemplary embodiment and its explanation is omitted but RF AGC 210 and IF AGC 211 shown in FIG. 2 correspond to RF AGC 110 and IF AGC 111 shown in FIG. 1. A reverse type is used as a tuner circuit 201. An aperture control circuit composing of delay circuits 212 and 213, inverter circuits 214 and 216, amplifier circuit 215 and an addition circuit 217 outputs a horizontal boundary enforcing signal having a peak at 1/(2*t) Hz in its frequency characteristic, where t(ns) is a delay amount of delay circuits 212 and 213.

The horizontal boundary enforcing signal passes through coring circuit 218, is gain controlled at gain control circuit 219, is added to a main luminance signal at addition circuit 220 and then is supplied to luminance signal processing circuit 209.

Figure 6A:
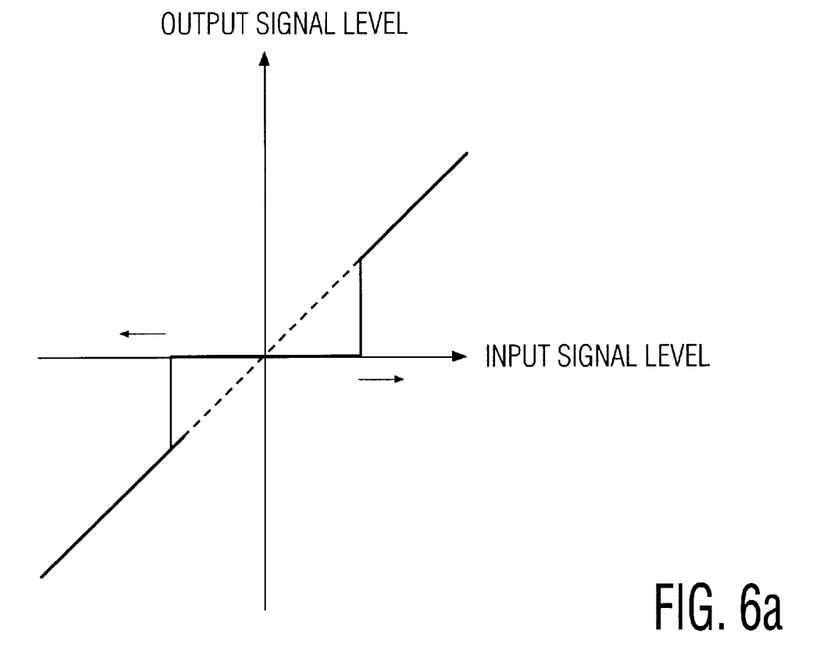
FIGS. 6(a) and 6(b) are two illustrative examples of an input/output characteristic of a coring circuit of a noise suppression apparatus in accordance with the second and fourth exemplary embodiments of the present invention.
Figure 6B:
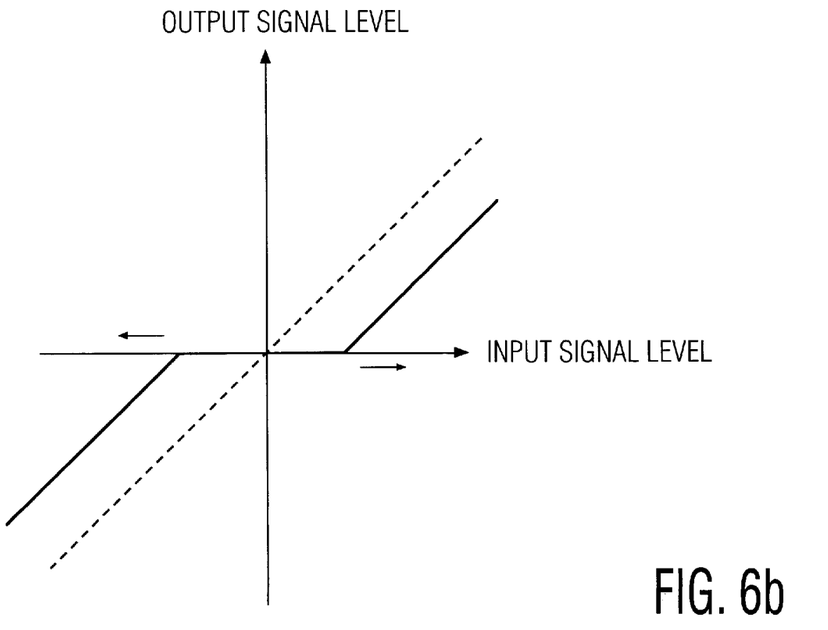

FIGS. 6(a) and 6(b) show two different characteristics of coring circuit 218, The abscissa expresses an input signal level and the ordinate expresses an output signal level. The broken lines are characteristics when a coring circuit is not used (without coring compensation).

When IF AGC voltage 211 increases, the coring characteristics move outwards from the broken lines to the solid lines as shown in FIGS. 6(a) and 6(b). The coring circuit 218 works so as to suppress noise at a fringe area of reception.

Thus, in accordance with the second exemplary embodiment of the present invention, a noise suppression effect at a fringe area reception can be expected by controlling the characteristics of coring circuit 218 as shown FIGS. 6(a) and 6(b) by IF AGC voltage 211.

(Third Exemplary Embodiment)

Figure 3:
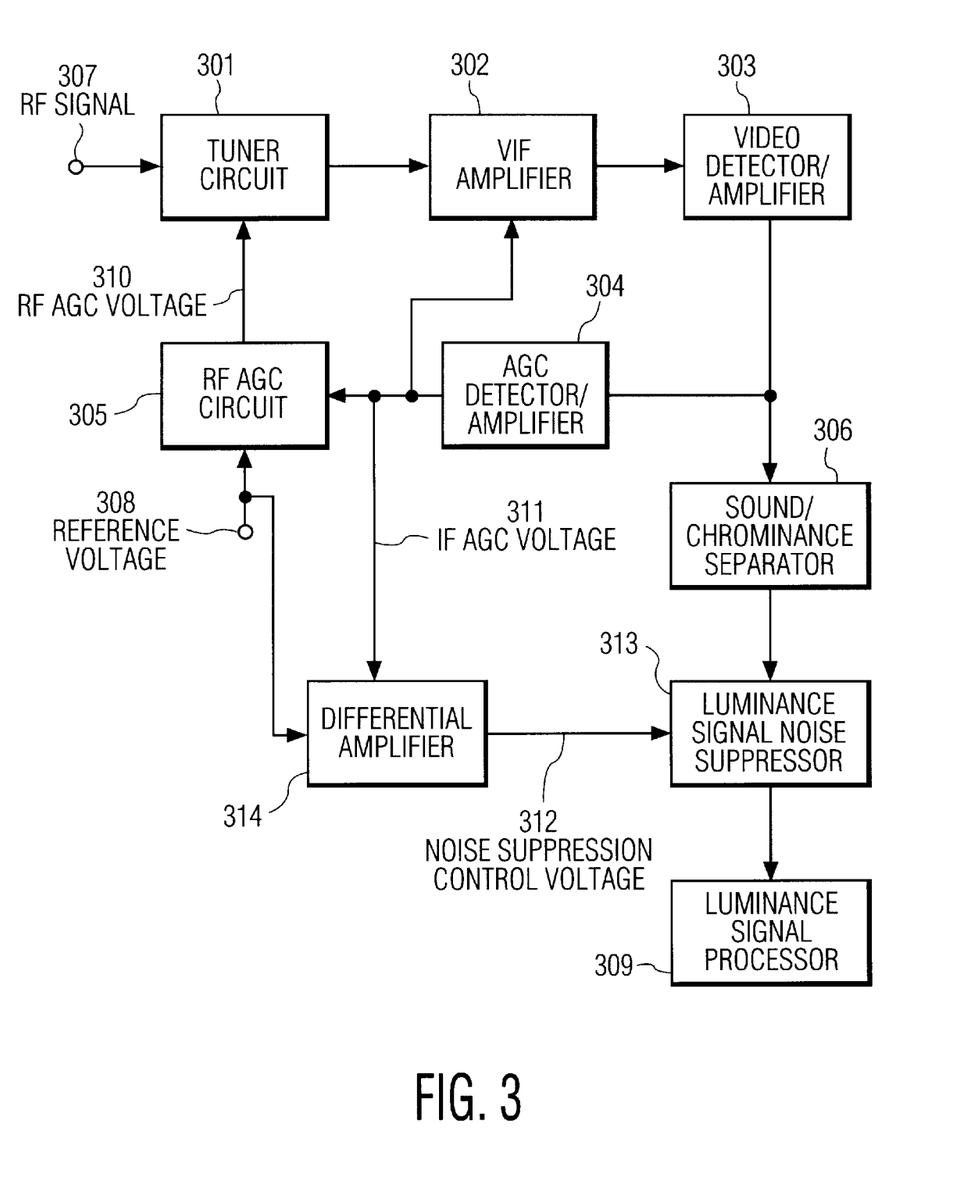
FIG. 3 is a block diagram of a noise suppression apparatus in accordance with a third exemplary embodiment of the present invention.

FIG. 3 is a block diagram of a noise suppression apparatus in accordance with a third exemplary embodiment of the present invention. In FIG. 3, the block 301 is a tuner circuit. The block 302 is a video IF amplifier circuit. The block 303 is a video detector/amplifier circuit. The block 304 is an AGC detector/amplifier circuit. The block 305 is an RF AGC circuit. The block 306 is a sound/chrominance separator circuit. The signal 307 is an RF signal. The voltage 308 is a reference voltage. The block 309 is a luminance signal processing circuit. The voltage 310 is an RF AGC voltage. The voltage 311 is an IF AGC voltage. The voltage 312 is a noise suppression control voltage. The block 313 is a luminance signal noise suppression circuit. The block 314 is a differential amplifier circuit.

The function of a noise suppression apparatus composed like the above is explained below, referring to FIGS. 3 and 7.

Figure 7A:
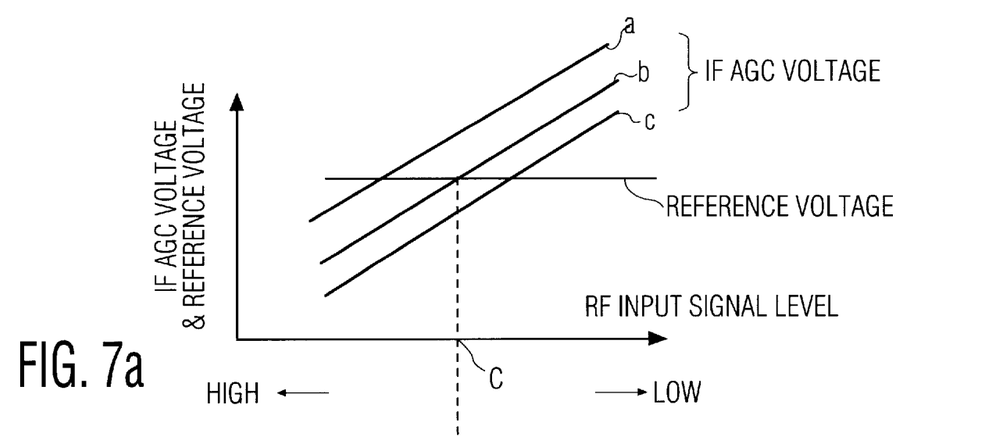
FIG. 7(a) illustrates the characteristic of IF AGC voltage against electric field strength of a noise suppression apparatus in accordance with the third and fourth exemplary embodiments of the present invention.

FIG. 7 shows characteristics to explain the function of a noise suppression apparatus shown in FIG. 3. FIG. 7(a) is characteristics of a reference voltage 308 inputted to RF AGC circuit 305 and IF AGC voltage 311 against the electric field strength (RF signal 307). RF AGC voltage 310 is fixed to a certain voltage. Tuner circuit 301 is of a reverse type.

In FIG. 7(a), IF AGC voltage a, b and c show various characteristics due to various values of the total gain of tuner circuit 301, video IF amplifier 302, video detector/amplifier 303 and AGC detector/amplifier 304.

Generally, RF AGC is adjusted by adjusting reference voltage 308 so that IF AGC voltage 311 is equal to reference voltage 308 in a condition that RF signal 307 is fixed to a certain electric field strength (point C in FIG. 7) and RF AGC voltage 310 is also fixed to a certain voltage.

In FIG. 7(a), straight line b indicates that IF AGC voltage 311 is fixed to point C. RF AGC circuit 305 works to decrease the RF AGC voltage 310 minimum when IF AGC voltage 311 is lower than reference voltage 308 and works to increase the RF AGC voltage 310 maximum when IF AGC voltage 311 is higher than reference voltage 308.

Figure 7B:
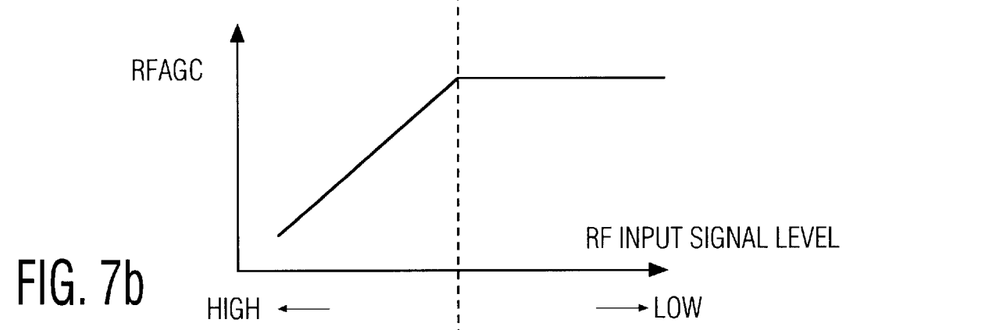
FIG. 7(b) illustrates the characteristic of RF AGC voltage against electric field strength of a noise suppression apparatus in accordance with the third and fourth exemplary embodiments of the present invention.

Therefore, the RF AGC characteristic becomes that shown in FIG. 7(b). When IF AGC voltage 311 after RF AGC adjustment and reference voltage 308 are inputted to differential amplifier circuit 314, the output voltage 312 of differential amplifier circuit 314 gives a characteristic shown in FIG. 7(c). This characteristic is obtained because IF AGC voltage 311 after RF AGC adjustment is always the same as reference voltage 308 at level C.

In the case in which a noise suppression control voltage 312 is inputted to luminance signal noise suppression circuit 313 and the noise suppression control voltage 312 is high, if increase in the noise suppression effect is attempted after an RF AGC adjustment, the noise suppression effect increases only when the RF input signal level is lower than level C of RF input signal level 307.

Thus, in accordance with the third exemplary embodiment of the present invention, a noise suppression effect can be increased preferably only when the RF input signal level is lower than level C of RF input signal level 307 by controlling the noise suppression level of the luminance signal noise suppression circuit using noise suppression control voltage 312.

(Fourth Exemplary Embodiment)

Figure 4:
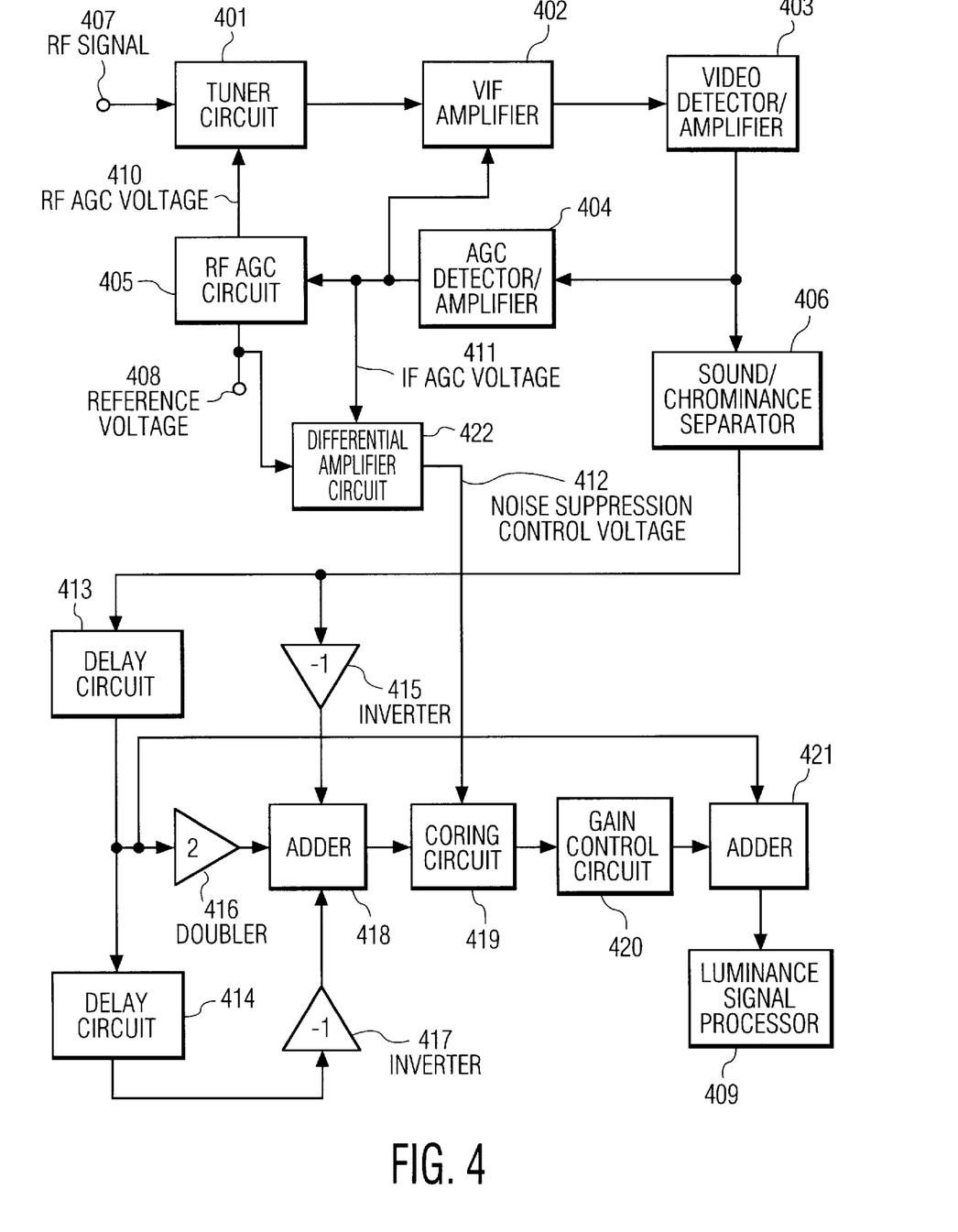
FIG. 4 is a block diagram of a noise suppression apparatus in accordance with a fourth exemplary embodiment of the present invention.

FIG. 4 is a block diagram of a noise suppression apparatus in accordance with a fourth exemplary embodiment of the present invention. In FIG. 4, the block 401 is a tuner circuit. The block 402 is a video IF amplifier circuit. The block 403 is a video detector/amplifier circuit. The block 404 is an AGC detector/amplifier circuit. The block 405 is an RF AGC circuit. The block 406 is a sound/chrominance separator circuit. The signal 407 is an RF signal. The voltage 408 is a reference voltage. The block 409 is a luminance signal processing circuit. The voltage 410 is an RF AGC voltage. The voltage 411 is an IF AGC voltage. The voltage 412 is a noise suppression control voltage. The blocks 413 and 414 are delay circuits. The blocks 415 and 417 are inverse circuits. The block 416 is an amplifier circuit. The blocks 428 and 421 are addition circuits. The block 419 is a coring circuit. The block 420 is a gain control circuit. The block 422 is a differential amplifier circuit.

The function of a noise suppression apparatus above is explained below, referring to FIGS. 4, 6 and 7. An aperture control circuit composed of delay circuits 423 and 414, inverse circuits 415 and 417, amplifier circuit 416 and addition circuit 418 outputs a horizontal boundary enforcing signal having a peak at $1/(2*t)$ Hz in its frequency characteristic, where t(ns) is a delay amount of delay circuits 423 and 414. The horizontal boundary enforcing signal passes through coring circuit 419, is gain controlled at gain control circuit 420, is added to a main luminance signal at addition circuit 421 and then is supplied to following luminance signal processing circuit 409.

FIGS. 6(a) and 6(b) show two different characteristics of coring circuit 419 and the abscissa expresses an input signal level and the ordinate expresses an output signal level. The broken lines are characteristics when a coring circuit is not used (without coring compensation).

Figure 7C:
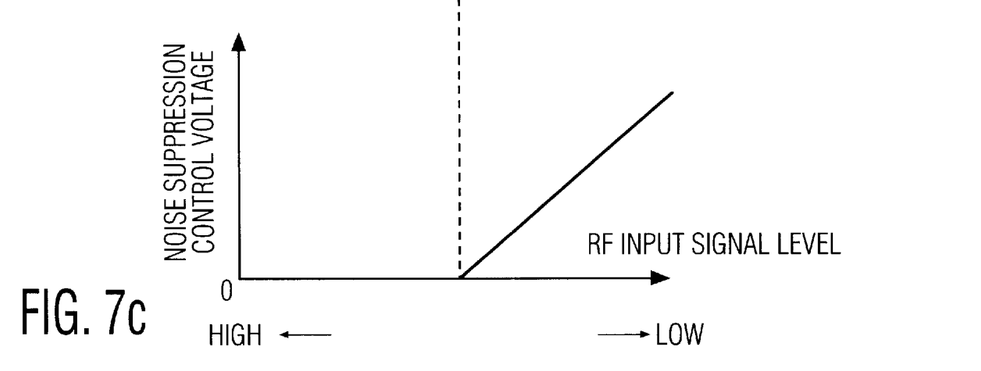
FIG. 7(c) illustrates the characteristic of noise suppression control voltage against electric field strength of a noise suppression apparatus in accordance with the third and fourth exemplary embodiments of the present invention.

Explanation of FIG. 7 is omitted here because it was already explained in the third exemplary embodiment. IF AGC voltage 411, reference voltage 408, RF AGC voltage 410 and noise suppression control voltage 412 correspond to 311, 308, 310 and 312 of third exemplary embodiment, respectively.

In the case in which a noise suppression control voltage 412 is inputted to coring circuit 419 and the noise suppression control voltage 412 is high, if the coring characteristics are moved in directions shown in FIGS. 6(a) and 6(b), the noise suppression effect after an RF AGC adjustment increases preferably only when the RF input signal level is lower than level C of RF input signal level 407.

Thus, according to a noise suppression apparatus in accordance with the fourth exemplary embodiment of the present invention, a noise suppression effect can be raised preferably only when the RF input signal level is lower than level C of RF input signal level 407 by controlling the coring characteristic of coring circuit 419 using noise suppression control voltage 412 as shown in FIGS. 6(a) and 6(b).

Thus, according to the present invention, the noise suppression apparatus can give the effect of suppressing noise at a fringe area of reception by providing a tuner circuit, a video IF amplifier circuit, a video detector/amplifier circuit, an AGC detector/amplifier circuit, an RF AGC circuit, a sound/chrominance separator circuit, a luminance signal noise suppression circuit and a luminance signal processing circuit.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A noise suppression apparatus for use with a radio frequency (RF) signal, the apparatus comprising:

receiving means for receiving the RF signal;

luminance signal separation means for separating a luminance signal from the RF signal;

control means for controlling a gain of the receiving means and generating a control signal based on a strength of the RF signal; and a coring circuit, responsive to the control signal for outputting one of a first signal level changing at a first predetermined rate, a second signal level changing at a second predetermined rate, and a third signal level based on the luminance signal;

a gain controlling circuit for controlling the gain of the output of the coring circuit and for outputting a gain controlled signal; and an adder circuit for outputting a noise suppressed luminance signal by adding the gain controlled signal to the luminance signal.

2. A noise suppression apparatus as recited in claim 1, further comprising:

fringe area detecting means for detecting if said RF signal received at said receiving means is a fringe area signal, wherein noise included in the luminance signal is suppressed in the noise suppressed luminance signal responsive to an output of said fringe area detecting means.

3. A noise suppression apparatus as recited in claim 2, wherein said fringe area detecting means detects said RF signal as said fringe area signal when the electric field strength of a wave transmitting said RF signal is lower than a predetermined value.

4. A noise suppression apparatus as recited in claim 2, wherein said fringe area detecting means detects said RF signal as said fringe area signal when the RF signal level received by said receiving means is lower than a predetermined value.

5. A noise suppression apparatus according to claim 1, wherein the gain of the receiving means is i) increased at a predetermined rate as the strength of the RF signal decreases to a predetermined level and ii) maintained at a fixed value as the strength of the RF signal decreases below the predetermined level.

6. A noise suppression apparatus according to claim 1, wherein the control signal from the control means increases at a predetermined rate as the strength of the RF signal decreases below a predetermined level.

7. A noise suppression apparatus for use with a radio frequency (RF) signal, the apparatus comprising:

a tuner circuit for receiving the RF signal;

a video intermediate frequency (IF) amplification circuit for amplifying an output signal of said tuner circuit;

a video detection/amplification circuit for detecting, separating and amplifying the output signal of said video IF amplification circuit;

an automatic gain control (AGC) detection and amplification circuit for outputting an AGC voltage to the video IF amplification circuit based on the output of said video detection and amplification circuit;

an RF AGC circuit for generating a control signal and applying the control signal to the tuner based on the output of said AGC detection and amplification circuit;

a luminance signal separation circuit for separating a luminance signal from the output of said video detection and amplification circuit;

a coring circuit, responsive to the AGC voltage, for outputting one of a first signal level changing at a first predetermined rate, a second signal level changing at a second predetermined rate, and a third signal level based on the luminance signal;

a gain controlling circuit for controlling the gain of the output of the coring circuit and for outputting a gain controlled signal; and an adder circuit for outputting a noise suppressed luminance signal by adding the gain controlled signal to the luminance signal.

8. A noise suppression apparatus as recited in claim 7, wherein noise included in the luminance signal is suppressed in the noise suppressed luminance signal when a wave transmitting said RF signal is a fringe area signal.

9. A noise suppression apparatus according to claim 7, wherein the control signal from the RF AGC circuit i) increases at a predetermined rate as a strength of the RF signal decreases to a predetermined level and ii) is maintained at a fixed value as the strength of the RF signal decreases below the predetermined level.

10. A noise suppression apparatus according to claim 7, wherein the AGC voltage from the AGC detection and amplification circuit increases at a predetermined rate as a strength of the RF signal decreases below a predetermined level.

11. A noise suppression apparatus for use with a radio frequency (RF) signal, the apparatus comprising:

a tuner circuit for receiving the RF signal;

a video IF amplification circuit for amplifying an output signal of said tuner circuit;

a video detection and amplification circuit for detecting, separating and amplifying the output signal of said video IF amplification circuit;

an AGC detection and amplification circuit for outputting an AGC voltage based on the output of said video detection and amplification circuit;

an RF AGC circuit for applying the AGC voltage to an RF signal based on the output of said AGC detection and amplification circuit;

a luminance signal separation circuit for separating a luminance signal from the output of said video detection and amplification circuit;

a first delay circuit for delaying the luminance signal separated at said luminance signal separation circuit;

a second delay circuit for further delaying an output signal of said first delay circuit;

a first inverter circuit for inverting a polarity of the luminance signal separated at said luminance signal separation circuit;

a second inverter circuit for inverting a polarity of the output signal of said second delay circuit;

an amplifier circuit for amplifying the output signal of said first delay circuit;

a first adder circuit for adding the output signals of said first and second inverter circuits and said amplifier circuit;

a coring circuit, coupled to the AGC detection and amplification circuit and first adder circuit, for coring compensating the output signal of said first adder circuit and generating a coring output signal responsive to the AGC voltage;

a gain control circuit for adjusting an output level of said coring output signal; and a second adder circuit for outputting a noise suppressed luminance signal by adding output signals of said first delay circuit and said gain control circuit.

12. A noise suppression apparatus as recited in claim 11, wherein noise included in the luminance signal is suppressed in the noise suppressed luminance signal when the wave transmitting said RF signal is a fringe area signal.

13. A noise suppression apparatus as recited in claim 12, wherein said tuner circuit includes means for determining if said RF signal is said fringe area signal.

14. A noise suppression apparatus according to claim 11, wherein the coring circuit output signal includes
   i) a first signal level changing at a first predetermined rate when the output signal of said first adder circuit is less than a first value,
   ii) a second signal level changing at a second predetermined rate when the output signal of said first adder circuit is greater than a second value, and
   iii) a third signal level when the output signal of said first adder circuit is between the first value and the second value.

15. A noise suppression apparatus for use with a radio frequency (RF) signal, the apparatus comprising:
   a tuner circuit for receiving the RF signal;
   a video IF amplification circuit for amplifying an output signal of said tuner circuit;
   a video detection/amplification circuit for detecting, separating and amplifying the output signal of said video IF amplification circuit;
   an AGC detection and amplification circuit for outputting an AGC voltage based on the output of said video detection and amplification circuit;
   an RF AGC circuit for (i) decreasing a gain of the tuner circuit when the AGC voltage of the AGC detection and amplification circuit is lower than a reference voltage, and (ii) increasing the gain of the tuner circuit when the AGC voltage of the AGC detection and amplification circuit is higher than the reference voltage;
   a luminance signal separation circuit for separating a luminance signal from the output of said video detection and amplification circuit;
   a differential amplifier circuit for generating a noise suppression control voltage based on a difference between the AGC voltage output of said AGC detection and amplification circuit and a reference voltage;
   a coring circuit, responsive to the noise suppression control voltage, for outputting one of a first signal level changing at a first predetermined rate, a second signal level changing at a second predetermined rate, and a third signal level based on the luminance signal;
   a gain controlling circuit for controlling the gain of the output of the coring circuit and for outputting a gain controlled signal; and
   an adder circuit for outputting a noise suppressed luminance signal by adding the gain controlled signal to the luminance signal.

16. A noise suppression apparatus as recited in claim 15, wherein noise included in the luminance signal is suppressed when a signal level of said RF signal received by said tuner circuit is smaller than a predetermined value.

17. A noise suppression apparatus for use with a radio frequency (RF) signal, the apparatus comprising:
   a tuner circuit for receiving the RF signal;
   a video IF amplification circuit for amplifying an output signal of said tuner circuit;
   a video detection and amplification circuit for detecting, separating and amplifying an output signal of said video IF amplification circuit;
   an AGC detection and amplification circuit for outputting an AGC voltage based on an output of said video detection and amplification circuit;
   an RF AGC circuit for (i) decreasing a gain of the tuner circuit when the AGC voltage of the AGC detection and amplification circuit is lower than a reference voltage, and (ii) increasing the gain of the tuner circuit when the AGC voltage of the AGC detection and amplification circuit is higher than the reference voltage;
   a luminance signal separation circuit for separating a luminance signal from the output of said video detection and amplification circuit;
   a first delay circuit for delaying the luminance signal separated at said luminance signal separation circuit;
   a second delay circuit for further delaying an output signal of said first delay circuit;
   a first inverter circuit for inverting a polarity of the luminance signal separated at said luminance signal separation circuit;
   a second inverter circuit for inverting a polarity of the output signal of said second delay circuit;
   a doubler circuit for amplifying the output signal of said first delay circuit by two times;
   a first adder circuit for adding output signals of said first and second inverter circuits and said doubler circuit;
   a differential amplifier circuit for generating a differential signal based on a difference between the AGC voltage and the reference voltage;
   a coring circuit, responsive to the differential signal, for outputting one of a first signal level changing at a first predetermined rate, a second signal level changing at a second predetermined rate, and a third signal level based on the output of said first adder;
   a gain control circuit for adjusting the output level of said coring circuit; and
   a second adder circuit for outputting a noise suppressed luminance signal by adding the output signals of said first delay circuit and said gain control circuit.

18. A noise suppression apparatus as recited in claim 17, wherein noise included in the luminance signal is suppressed by adjusting a coring level of said coring circuit when a RF signal level of said RF signal received by said tuner circuit is smaller than a predetermined value.

19. A noise suppression apparatus according to claim 17, wherein the coring circuit output signal includes
   i) a first signal level changing at a first predetermined rate when the output signal of said first adder circuit is less than a first value,
   ii) a second signal level changing at a second predetermined rate when the output signal of said first adder circuit is greater than a second value, and
   iii) a third signal level when the output signal of said first adder circuit is between the first value and the second value.

* * * * *